(12) United States Patent
Tsai et al.

(10) Patent No.: US 11,262,237 B2
(45) Date of Patent: Mar. 1, 2022

(54) SPECTRAL ANALYSIS DEVICE

(71) Applicant: Chang Gung University, Taoyuan (TW)

(72) Inventors: Meng Tsan Tsai, Taoyuan (TW); Tai Ang Wang, Taoyuan (TW); Cheng Yu Lee, Taoyuan (TW)

(73) Assignee: Chang Gung University, Taoyuan (TW)

( * ) Notice: Subject to any disclaimer, the term of this patent is extended or adjusted under 35 U.S.C. 154(b) by 0 days.

(21) Appl. No.: 17/130,256

(22) Filed: Dec. 22, 2020

(65) Prior Publication Data

US 2021/0396578 A1    Dec. 23, 2021

(30) Foreign Application Priority Data

Jun. 23, 2020   (TW) .................................. 109121253

(51) Int. Cl.
*G01J 3/28*    (2006.01)
*G01J 3/18*    (2006.01)
*G01J 3/02*    (2006.01)

(52) U.S. Cl.
CPC ................. *G01J 3/18* (2013.01); *G01J 3/021* (2013.01); *G01J 3/0208* (2013.01); *G01J 3/2803* (2013.01)

(58) Field of Classification Search
CPC ........ G01J 3/18; G01J 3/28; G01J 3/14; G01J 3/02; G01J 3/2803; G01J 3/0208; G01J 3/021
See application file for complete search history.

(56) References Cited

U.S. PATENT DOCUMENTS

| | | | |
|---|---|---|---|
| 5,442,439 A * | 8/1995 | Battey ....................... | G01J 3/02 356/328 |
| 7,548,313 B2 * | 6/2009 | Nguyen .................... | G01J 3/02 356/328 |
| 2005/0007586 A1 * | 1/2005 | Bastue ...................... | G01J 3/18 356/328 |
| 2010/0033718 A1 * | 2/2010 | Tanaami .......... | G01N 27/44721 356/301 |

\* cited by examiner

*Primary Examiner* — Abdullahi Nur
(74) *Attorney, Agent, or Firm* — Locke Lord LLP; Tim Tingkang Xia, Esq.

(57) ABSTRACT

A spectral analysis device is provided herein. The spectral analysis device includes a first lens, a transmission grating, a lens set and a sensing element. The first lens is configured to receive and converge an incident light beam into a first light beam. The transmission grating is configured to disperse the first light beam into a plurality of second light beams. The lens set is configured to receive the plurality of second light beams. The sensing element includes a substrate and a plurality of pixels. The plurality of pixels is configured to respectively receive the plurality of second light beam. Such structure is used to analyze the spectrum of incident light.

10 Claims, 4 Drawing Sheets

SPECTRAL ANALYSIS DEVICE

REFERENCE TO RELATED APPLICATIONS

The present application is based on, and claims priority from, Taiwan application number 109121253, filed Jun. 23, 2020, the disclosure of which is hereby incorporated by reference herein in its entirety.

BACKGROUND OF THE INVENTION

Field of the Invention

The present invention generally relates to a spectral analysis device and, more particular, to a device structure that uses an optical structure to disperse light into a plurality of light beams according to the wavelength and corresponds to a sensing element.

Description of the Prior Art

With the advancement of medical technology, spectral detection has become more and more advanced. Novel spectral analysis instruments, focused on spectroscopy technology, have been developed one after another to meet the market demands, and have attracted tremendous attention due to its wide applications in analyses for water quality, soil, environment, agricultural products, foods, cosmetics, etc.

The optical spectrum (referred to as "spectrum") is a pattern, in which dispersed monochromatic light beams are arranged in an order of wavelengths after polychromatic light is dispersed by the dispersion system. Spectral analysis is identifying a substance and determining its chemical composition and relative contents according to the spectrum of the substance, which has advantages such as sensitivity and rapidity. Modern spectral analysis instruments include atomic emission spectrometers (AES), atomic absorption spectrometers (AAS), infrared spectrometers, etc.

During spectral detection, spectrometers, spectrophotometers and related electronic equipment are used to measure the spectral lines of different light sources, and a fixed light source provided by the instrument is used to measure the absorption spectra, transmission spectra and reflection spectra of different substances. The spectra of different elements will have different spectral lines with respective wavelengths. Some spectral lines may be missing, but the spectra of substances containing the same element will always have spectral lines at the same wavelength. This is how spectral analysis devices analyze the elemental compositions of substances.

Accordingly, a portable spectrometer is developed to provide rapid detection on site without sending samples to be detected by large equipment in the laboratory so as to improve the detection efficiency. Devices capable of performing on-site detection are particularly important when expensive and difficult-to-transport samples with high complexity are to be detected. As portable or handheld spectrometers are being developed, optical instrument manufacturers have also begun to work on portability of laboratory instruments.

However, conventional portable spectrometers still cannot be widely used because of the structural complexity of the conventional portable spectrometers. They need to be operated by professionals in the field, who have been rigorously trained to interpret and understand the spectrum. If the data needs to be further confirmed, the sample has to be sent to the laboratory for analysis to obtain more reliable data. The process is exhausted, and the time is similar to the time required when a non-portable spectrometer is used, especially when the test results will be used in the manufacture of drugs (such as sample component scanning) or when the test results provide information for follow-up medical treatment (such as optical coherent tomography, OCT). Therefore, a lighter spectral analysis device with faster acquisition, better stability and more ease for personnel to operate is required.

In view of the above problems of the prior art, the present invention provides a spectral analysis device, which is composed of a plurality of optical elements. After the spectral analysis device receives light from a sample, the light passes through a first lens and then passes through a transmission grating. The transmission grating disperses the light into a plurality of dispersed light beams. A lens set receives the dispersed light beams, such that the dispersed light beams are respectively incident on a plurality of pixels of a sensing element. The spectral analysis device analyzes the incident spectrum, the transmission spectrum, the reflection spectrum, and the absorption spectrum of the sample, and is provided as a lighter analysis device.

SUMMARY OF THE INVENTION

One object of the present invention is to provide a spectral analysis device, including a first lens, a transmission grating, a lens set and a sensing element, such that the reflection light, the transmission light and the absorption light of a sample to be detected are dispersed into a plurality of light beams, which are respectively directed onto a plurality of pixels of the sensing element. The spectral analysis device analyzes the spectra of the reflection light, the transmission light and the absorption light to obtain data of the components of the sample.

To achieve the foregoing and other objects, the present invention provides a spectral analysis device, including: a first lens, a transmission grating, a lens set and a sensing element. The first lens is configured to receive and converge an incident light beam into a first light beam. The transmission grating is disposed corresponding to the first lens and is configured to receive and disperse the first light beam into a plurality of second light beams with different wavelengths. The lens set is disposed corresponding to the transmission grating and is configured to receive and converge the plurality of second light beams. The lens set includes, from an object side to an image side, a second lens and a third lens. The sensing element includes a substrate and a plurality of pixels. The plurality of pixels is disposed on the substrate and is configured to respectively receive the plurality of second light beams. Such structure is used to measure the spectral distribution (such as wavelength distribution) of incident light.

In one embodiment of the present invention, the second lens has a positive vertex power such that an image side thereof is convex.

In one embodiment of the present invention, the third lens has a positive vertex power such that an object side thereof is convex.

In one embodiment of the present invention, the sensing element is electrically connected to an electronic device and is configured to transmit a sensing signal.

In one embodiment of the present invention, the spectral analysis device further includes a reflector disposed between the transmission grating and the lens set, the reflector is slanted at a reflection angle within a range from 40° to 60°.

In one embodiment of the present invention, the transmission grating is slanted at a first angle within a range from 40° to 60°.

In one embodiment of the present invention, the sensing element is slanted at a second angle within a range from 0° to 10°.

BRIEF DESCRIPTION OF THE DRAWINGS

In order to make the above and other objects, features, advantages, and embodiments of the present disclosure easier to understand, the description of the accompanying drawings is as follows.

DESCRIPTION OF THE PREFERRED EMBODIMENTS

In order to provide a better understanding of the features and the objects of the present invention, the following embodiments and accompanying descriptions are presented herein.

The present invention provides a spectral analysis device composed of a plurality of optical elements, including a first lens, a transmission grating, a lens set and a sensing element. A plurality of pixels is provided on one side of the sensing element, which faces the lens set. The spectral analysis device is configured to receive an incident light beam. The first lens is configured to converge the incident light beam into a first light beam. Then, the first light beam passes through the transmission grating and is dispersed by the transmission grating into a plurality of second light beams. The lens set is configured to receive the plurality of second light beams. The plurality of pixels correspondingly receives the plurality of second light beams. Thereby, the spectral analysis device is able to analyze the spectrum of incident light.

Figure 1:
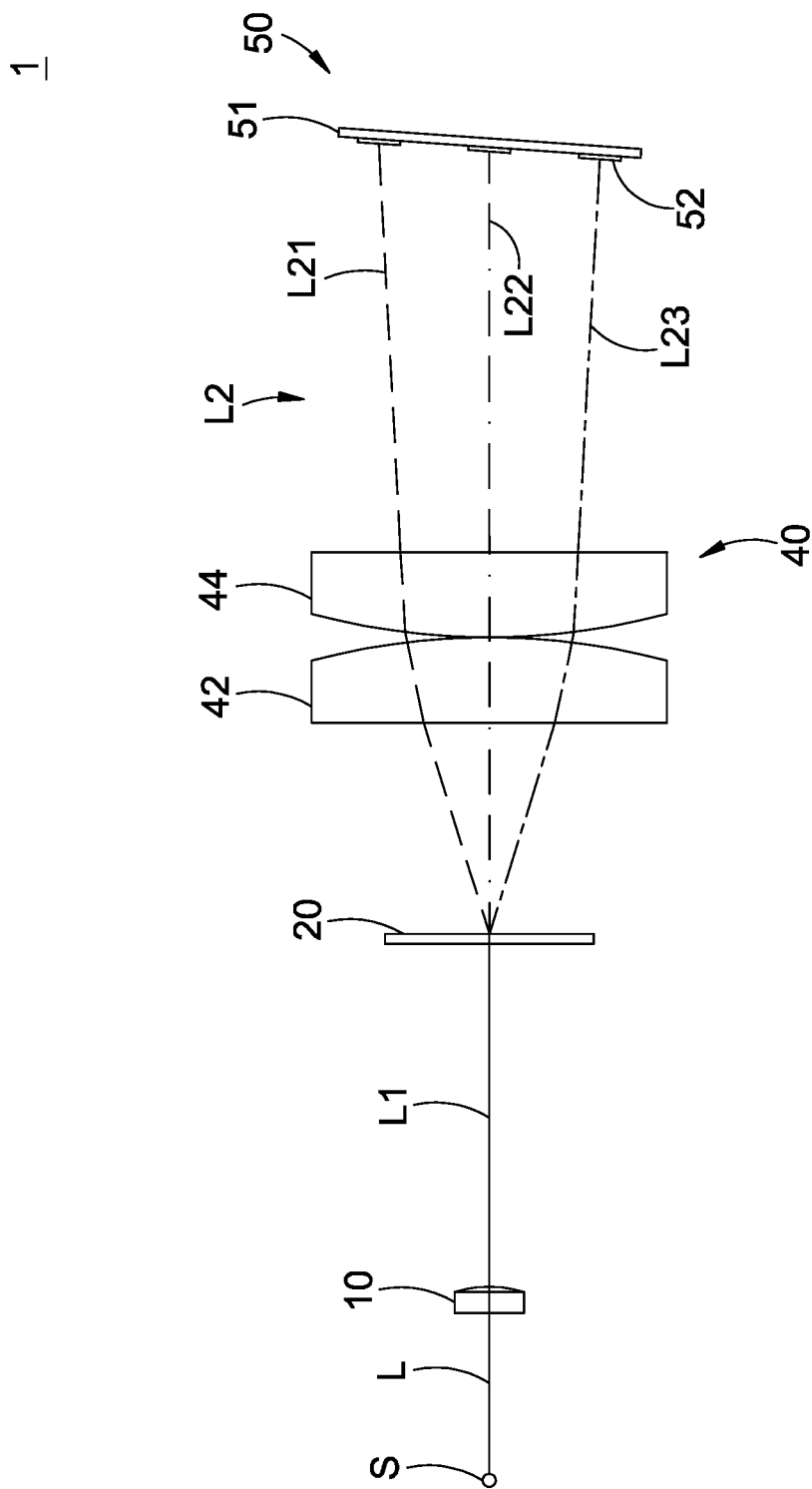
FIG. 1 is a schematic structural diagram according to one embodiment of the present invention.

Referring to FIG. 1, which is a schematic structural diagram of a spectral analysis device according to one embodiment of the present invention. As shown in FIG. 1, the spectral analysis device 1 in the present embodiment includes a first lens 10, a transmission grating 20, a lens set 40 and a sensing element 50. Among them, the spectral analysis device 1 is configured to receive and disperse an incident light beam L.

Referring to FIG. 1, in the present embodiment, the light beams travel from the object side to the image side of the transmission grating 20. For example, in one embodiment, the transmission grating 20 is correspondingly disposed on one side of the first lens 10, and the lens set 40 is correspondingly disposed on one side of the transmission grating 20, which is away from the first lens 10. The lens set 40 includes, from the object side to the image side, a second lens 42 and a third lens 44. The sensing element 50 is correspondingly disposed to face one side of the lens set 40, i.e., the image side of the second lens 42. The sensing element 50 includes a substrate 51 and a plurality of pixels 52. The plurality of pixels 52 is provided on one side of the substrate 51, which faces the lens set 40. The plurality of pixels 52 is evenly distributed on the substrate 51 of the sensing element 50. In the present embodiment, the sensing element 50 is a charge-coupled device (CCD).

As shown in FIG. 1, in the present embodiment, the light beam L is incident into the spectral analysis device 1. The incident light beam L may represent the reflection light, the transmission light, or the absorption light of a sample S to be detected. The first lens 10 is configured to receive and converge the incident light beam into a first light beam L1. The first lens 10 is configured to collimate the incident light beam L and regulates the shape and size of the incident light beam L. For example, the first lens 10 is configured to regulate the incident light beam L to form a circular light spot and collimate the incident light beam L to travel horizontally as the first light beam L1. The first light beam L1 passes through the transmission grating 20 to be dispersed into a plurality of second light beams L2. The transmission grating 20 is configured to disperse the first light beam L1 into a plurality of second light beams L2 with different wavelengths (for example, 600 nm, 750 nm and 900 nm) at different angles. In the present embodiment, the plurality of second light beams L2 can be exemplified by a first dispersed light beam L21, a second dispersed light beam L22 and a third dispersed light beam L23. After the lens set 40 receives the first dispersed light beam L21, the second dispersed light beam L22 and the third dispersed light beam L23 of the plurality of second light beams L2, the first dispersed light beam L21, the second dispersed light beam L22 and the third dispersed light beam L23 sequentially pass through the second lens 42 and the third lens 44. The plurality of pixels 52 of the sensing element 50 is configured to respectively receive the plurality of second light beams L2. In other words, the first dispersed light beam L21, the second dispersed light beam L22 and the third dispersed light beam L23 are respectively incident on the plurality of pixels 52 according to their wavelengths. For example, the first dispersed light beam L21 is incident on the left third of the plurality of pixels 52 of the sensing element 50, the second dispersed light beam L22 is incident on the middle third of the plurality of pixels 52 of the sensing element 50, and the third dispersed light beam L23 is incident on the right third of the plurality of pixels 52 of the sensing element 50, so as to complete the light path inside the spectral analysis device 1.

Figure 2:
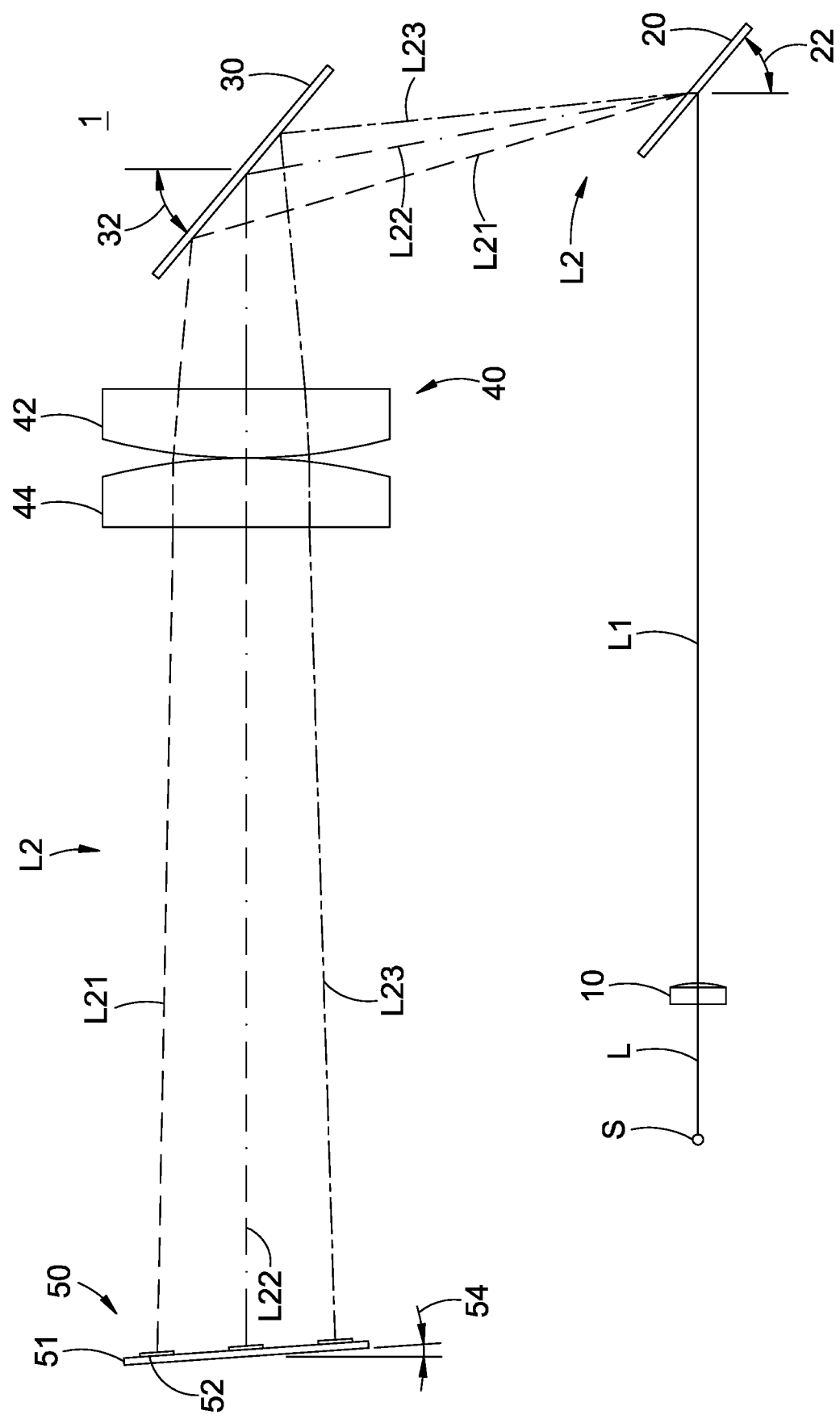
FIG. 2 is a structural schematic diagram according to another embodiment of the present invention.

Referring to FIG. 2, which is a structural schematic diagram according to another embodiment of the present invention. As shown in FIG. 2, based on the previous embodiment, another embodiment is taken as an example, in which a spectral analysis device 1 further includes a reflector 30 disposed between the transmission grating 20 and the lens set 40. In other words, the transmission grating 20 is correspondingly disposed on one side of the first lens 10, which is away from the sample S. The reflector 30 is correspondingly disposed on one side of the transmission grating 20, which is away from the sample S. The lens set 40 is correspondingly disposed on one side of the reflector 30, which is away from the sample S. In the present embodiment, the reflector is slanted at a reflection angle 32 within a range from 40° to 60° so as to reflect the second light beams L2 dispersed by the transmission grating 20 to the lens set 40. In other words, the reflector 30 is configured to change the light path to save space. For example, the reflector 30 reflects the first dispersed light beam L21, the second dispersed light beam L22 and the third dispersed light beam L23 of the second light beams L2 to the lens set 40.

Further, as shown in FIG. 2, in the present embodiment, the transmission grating 20 is slanted at a first angle 22 within a range from 40° to 60° so as to disperse and direct the received light beam L1 to the reflector 30. As mentioned above, the reflector 30 is slanted at a reflection angle 32 to reflect the received light beams L2 to the lens set 40. In the present embodiment, the reflection angle 32 is within a range from 40° to 60° so as to control the path of the second light beams L2. Further, the sensing element 50 is slanted at a second angle 54 within a range from 0° to 10° to correspond to the distance from the lens set 40 to the sensing element 50 and receive the second light beams L2 from the lens set 40.

Further, in the present embodiment, the second lens 42 and the third lens 44 of the lens set 40 are arranged adjacent to each other. The second lens 42 has a positive vertex power such that an image side thereof is convex. The third lens 44 has a positive vertex power such that an object side thereof is convex. In one embodiment, the second lens 42 has an object side being concave, and the third lens 44 has an image side being concave. In the present embodiment, the plurality of second light beams L2 passes through the second lens 42 and the third lens 44 and is directed to the plurality of pixels 52 of the sensing element 50. The lens set 40 regulates the shape of the plurality of second light beams L2 being reflected by the reflector 30. In the present embodiment, the shape of the plurality of second light beams L2 becomes rectangular to correspond to the plurality of pixels 52 of the sensing element 50 so that the plurality of pixels 52 is able to receive the plurality of second light beams L2 according to the wavelength to analyze the spectrum of the first light beam L1.

Figure 3:
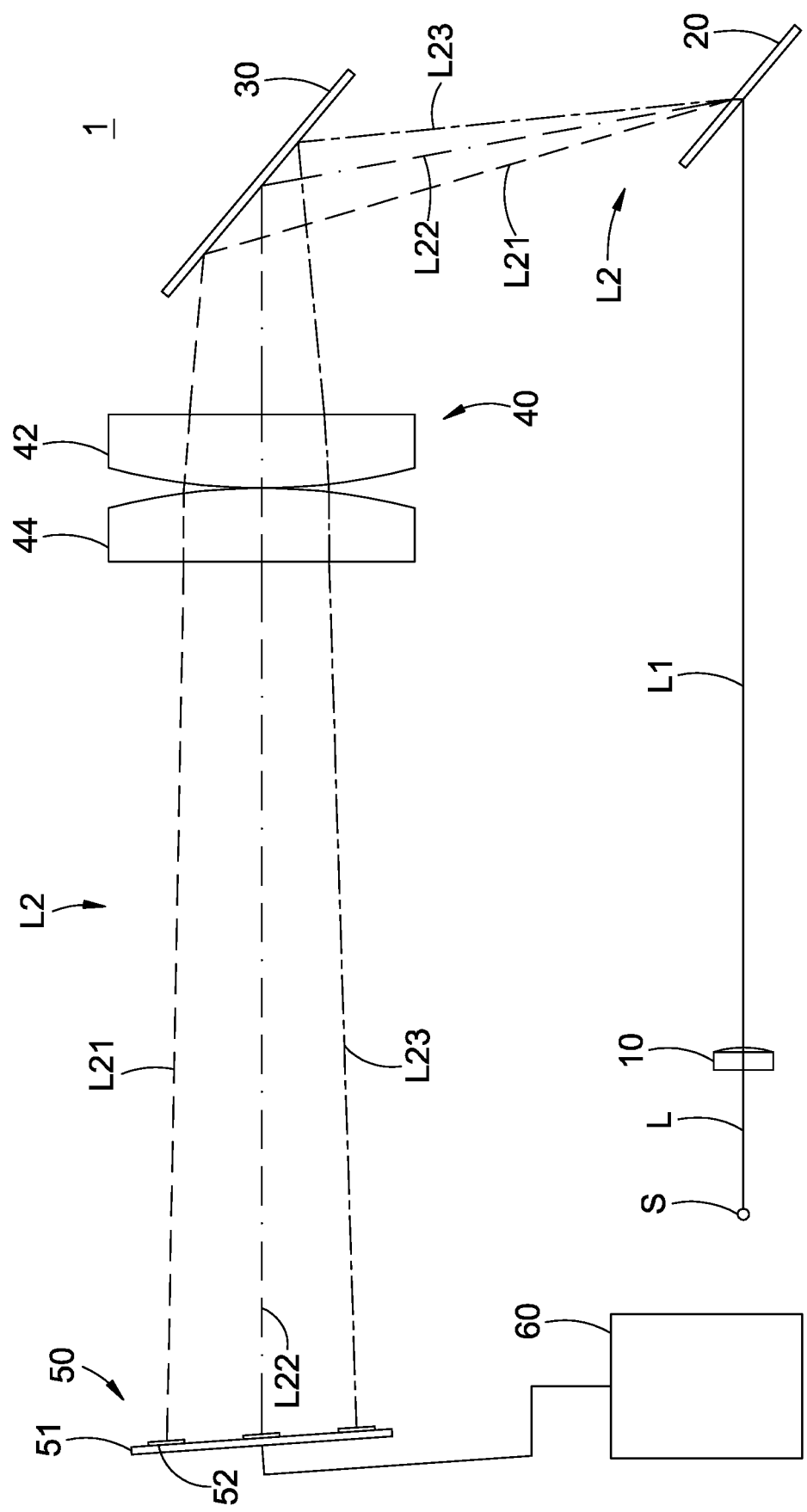
FIG. 3 is a schematic diagram showing the electrical connection of the components according to one embodiment of the present invention.
Figure 4:
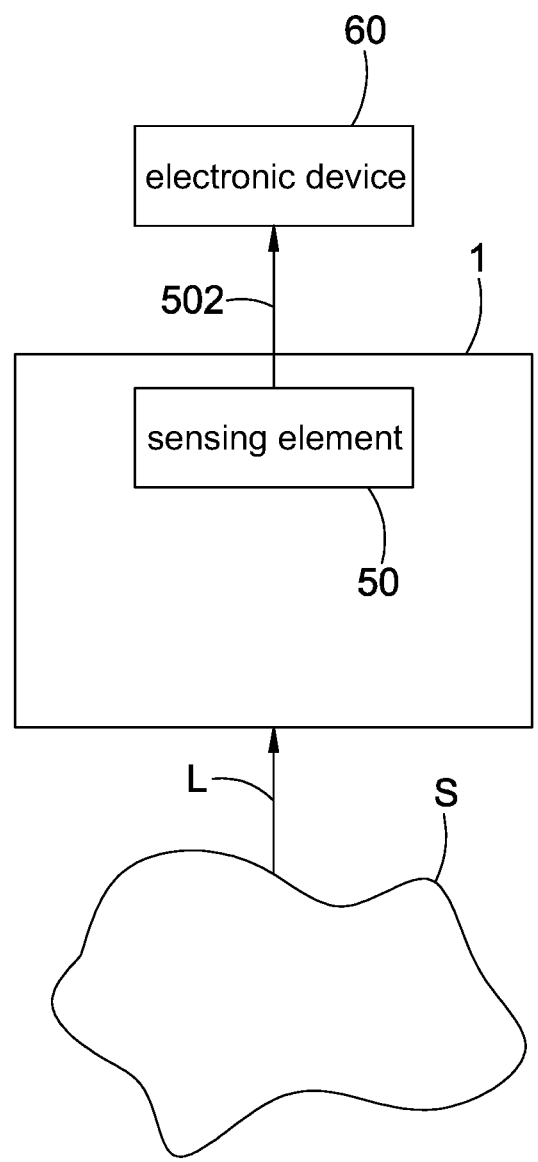
FIG. 4 is a schematic diagram showing signal transmission according to one embodiment of the present invention.

Referring to FIG. 3 and FIG. 4, FIG. 3 is a schematic diagram showing the electrical connection of the components according to one embodiment of the present invention, and FIG. 4 is a schematic diagram showing signal transmission according to one embodiment of the present invention. As shown in the drawings, in the present embodiment, the sample S to be detected is irradiated with light. The incident light beam L represents the reflection light, the transmission light, or the absorption light of the sample S to be detected. The incident light beam L is then received by the spectral analysis device 1. The light path inside the spectral analysis device 1 has been described as above and is thus not repeated here. The sensing element 50 is electrically connected to an electronic device 60 and transmits a sensing signal 502. The electronic device 60 is, for example, a processing device such as a computer. The plurality of pixels 52 of the sensing element 50 receives the plurality of second light beams L2 and transmits the sensing signal 502 to the electronic device 60 to analyze the spectrum of the sample S.

The spectral analysis device according to the present invention includes a first lens 10, a transmission grating 20, a lens set 40 and a sensing element 50 correspondingly disposed. In the spectral analysis device, the first lens 10 receives and converges an incident light beam L into a first light beam L1, which is then dispersed by the transmission grating 20 into a plurality of second light beams L2. Then, the lens set 40 directs the plurality of second light beams L2 to the plurality of pixels 52 of the sensing element 50 to analyze the spectrum of the incident light beam L from the sample S. In one embodiment, the spectral analysis device may further include a reflector 30 to reflect the plurality of second light beams L2 to change the light path.

As stated above, the present invention provides a spectral analysis device composed of a plurality of optical elements. After the spectral analysis device receive an incident light beam from a sample, the transmission grating disperses the light beams into a plurality of dispersed light beams, which is then received and directed by a lens set to a plurality of pixels of a sensing element. In this manner, the incident light beam can be dispersed into a plurality of dispersed light beams according to their wavelengths. The plurality of dispersed light beams is then correspondingly directed to the plurality of pixels of the sensing element to analyze the spectrum of the incident light beam. As such, a lighter analysis device is provided to solve the problem that the conventional device needs to be operated by professionals in the field, who have been rigorously trained, and that the sample has to be sent to the laboratory for analysis if the data needs to be further confirmed. This increases the time and labor cost. The present invention further uses a reflector to receive and reflect the light beams to change the light path to save space.

The above content is merely illustrative of the present invention. Although various embodiments of the present invention have been described to a certain degree of characteristics, with reference to one or more embodiments, those with ordinary skill in the art to which the present invention belongs can still make numerous modifications to the disclosed implementations without departing from the spirit and scope of the present invention.

What is claimed is:

1. A spectral analysis device, comprising:
a first lens, configured to receive an incident light beam and regulate shape and size of the incident light beam into a first light beam;
a transmission grating, disposed corresponding to the first lens and configured to receive and disperse the first light beam into a plurality of second light beams with different wavelengths at different angles;
a lens set, disposed corresponding to the transmission grating and comprising, from an object side to an image side, a second lens and a third lens, wherein the second lens is configured to receive and converge the plurality of second light beams and the third lens is configured to receive and converge the plurality of second light beams that has passed through the second lens; and
a sensing element, comprising a substrate and a plurality of pixels disposed on the substrate;
wherein the plurality of second light beams are respectively incident on the plurality of pixels according to the wavelengths of the second light beams.

2. The spectral analysis device of claim 1, wherein the second lens has a positive vertex power such that an image side thereof is convex.

3. The spectral analysis device of claim 1, wherein the third lens has a positive vertex power such that an object side thereof is convex.

4. The spectral analysis device of claim 1, wherein the sensing element is electrically connected to an electronic device and is configured to transmit a sensing signal.

5. The spectral analysis device of claim 1, further comprising a reflector disposed between the transmission grating and the lens set, the reflector is slanted at a reflection angle within a range from 40° to 60°.

6. The spectral analysis device of claim 5, wherein the transmission grating is slanted at a first angle within a range from 40° to 60°.

7. The spectral analysis device of claim 5, wherein the sensing element is slanted at a second angle within a range from 0° to 10°.

8. The spectral analysis device of claim 5, wherein the second lens has a positive vertex power such that an image side thereof is convex.

9. The spectral analysis device of claim 5, wherein the third lens has a positive vertex power such that an object side thereof is convex.

10. The spectral analysis device of claim 5, wherein the sensing element is electrically connected to an electronic device and is configured to transmit a sensing signal.

* * * * *